US006545786B1

(12) United States Patent
Park et al.

(10) Patent No.: US 6,545,786 B1
(45) Date of Patent: Apr. 8, 2003

(54) OPTICAL SELF-ROUTING SCHEME WITH LOW OPTICAL LOSS AND COMPACT SIZE

(75) Inventors: Sang Jo Park, Taejon (KR); Youn Seon Jang, Taejon (KR); Phil Joo Moon, Seoul (KR); Dong Choon Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/493,843

(22) Filed: Jan. 28, 2000

(30) Foreign Application Priority Data

Dec. 8, 1999 (KR) .............................. 99-55972

(51) Int. Cl.[7] .............................................. H04B 10/00
(52) U.S. Cl. ...................... 359/165; 359/130; 359/108
(58) Field of Search ............................... 359/165, 130, 359/108, 158

(56) References Cited

U.S. PATENT DOCUMENTS 5,060,305 A 10/1991 Prucnal et al. .............. 359/140
5,710,846 A 1/1998 Wayman et al. ............. 385/17
5,912,753 A * 6/1999 Cotter et al. ................ 359/137

OTHER PUBLICATIONS

Park et al., "All–Optical Address Extraction for Optical Routing," *Journal of Lightwave Technology*, 16(7):1129–1136, Jul. 7, 1998.

* cited by examiner

Primary Examiner—Kinfe-Michael Negash
(74) Attorney, Agent, or Firm—SEED IP Law Group PLLC

(57) ABSTRACT

The present invention relates to a routing address encoder, a routing controller, and a routing switch, which decrease the number and the length of optical splitting and optical delay line at optical routing circuits in optical communication network. A routing address encoder in accordance with an embodiment of the present invention includes a pulse generator, an external modulator, an optical address generator, an address selection signal generator, an optical switch, and optical OR gate means. An optical routing circuit for decoding optical routing information received from optical communication network and routing optical signals on the basis of routing address is provided. An optical routing circuit includes an optical splitter, a routing controller, and a routing switch.

9 Claims, 6 Drawing Sheets

FIG. 5A

| $\alpha_3 \alpha_2$ | SELECTOR OUTPUT |
|---|---|
| 00 | a1 |
| 01 | b1 |
| 10 | c1 |
| 11 | d1 |

FIG. 5B

| $\alpha_1 \alpha_0$ | SELECTOR OUTPUT |
|---|---|
| 00 | a2 |
| 01 | b2 |
| 10 | c2 |
| 11 | d2 |

US 6,545,786 B1

OPTICAL SELF-ROUTING SCHEME WITH LOW OPTICAL LOSS AND COMPACT SIZE

TECHNICAL FIELD

The present invention relates to a routing address encoder, a routing controller, and a routing switch, which decrease the number and the length of optical splitting and optical delay line at optical routing circuits in optical communication network. Therefore, optical loss is reduced and miniaturization of the devices is accomplished.

BACKGROUND OF THE INVENTION

FIGS. 1A and 1B are block diagrams for illustrating a conventional address encoder and a conventional address decoder for optical routing circuit. FIG. 1A illustrates a routing address encoder at transmission part and FIG. 1B illustrates a routing address decoder at receiving part.

The routing address decoder includes a pulse generator 10, an external modulator 11, optical splitters 12 and 13, and an optical delay line 14. The pulse generator 10 generates ultrashort wave pulse. The external modulator 11 converts the ultrashort wave pulse into optical pulse. The optical splitter 12 splits optical signal of the external modulator into $2^m$ signals, if routing information is m bit information. The optical splitter 13 receives optical signals from the splitter 12 and splits optical signal of. terminals into square of $2^m+1$ signals. The optical delay line 14 receives output signal of the optical splitter 13 and delays the optical signal by multiple of τ.

With the structure described above, the pulse generator 10 generates ultrashort wave pulse and the ultrashort wave pulse is converted into optical pulse by the external modulator 11. If routing information is m bit, the optical splitter 12 splits the optical signal into $2^m$ signals. At each output terminal of the splitter 12, the signal is split into square of $2^m+1$ signals by the splitter 13. $2^m+1$ optical delay lines are connected for encoding with CDM (code division multiplexing) scheme in accordance with code value of OOC (Optical Orthogonal Code) like prime code.

The routing decoder includes an optical splitter 15, an optical splitter 16, and an optical delay line 17. The optical splitter 15 receives the optical CDM signals and splits the signal into $2^m$ signals. The optical splitter 16 receives optical signals from the splitter 15 and splits optical signal of terminals into square of $2^m+1$ signals. The optical delay line 17 receives output signal of the optical splitter 16 and delays the optical signal by multiple of τ.

With the structure described above, the optical splitter 15 receives the optical CDM signals and splits the signal into $2^m$ signals. At each output terminal of the splitter 15, the optical signal is split into square of $2^m+1$ signals by the splitter 16. $2^m+1$ optical delay lines are connected as the optical delay line 14 in FIG. 1A. Routing information is decoded and decoded signal is generated to routing controller.

Totally, $2^m+1$ optical delay lines are connected with the optical delay line 14 and 17 of the routing address encoder and the decoder.

Optical loss is big at the conventional optical routing circuits described because there are a number of optical splitting terminals. In addition, since the number and the length of optical delay lines are increased, it is impossible to implement small size optical routing circuit with conventional scheme.

SUMMARY OF THE INVENTION

A routing address encoder for encoding routing information with optical signals in optical communication networks is provided. A routing address encoder in accordance with an embodiment of the present invention includes a pulse generator, an external modulator, an optical address generator, an address selection signal generator, an optical switch, and optical OR gate means. The pulse generator generates ultrashort wave pulse a, b, and c. The external modulator converts the ultrashort wave pulse a and c into optical pulse. The optical address generator uses the converted optical pulse a' as a control bit for upper m/2 (m: bit number of routing address) and generates optical address d. The address selection signal generator receives the ultrashort wave pulse b, uses the ultrashort wave pulse as a control bit for lower m/2, selects an output of the optical address generator, and generates address selection signal e. The optical switch switches input of the optical address generator. The optical switch is controlled by output of the address selection signal generator. The optical OR gate means performs OR operation with reference pulse c' and output f of the optical switch and generates routing address g. The external modulator converts the reference pulse into optical signal.

Preferably, the pulse a is continuously generated $2^{m/2}$ pulses with a period τ(τ=routing address encoding time/$2^m$: after reference pulse is generated and the pulse b is pulse generated with $2^{m/2}$ τ period after τ from generating reference pulse, and the pulse c is reference pulse.

Preferably, the optical address generator includes an optical splitter, an optical delay line, and an optical selector. The optical splitter receives the pulse a and splits the pulse a into m signals, if bit number for routing address is m. The optical delay line receives the split signal from the optical splitter and delays the split signal by $2^{m/2}$ multiple of τ. The optical selector uses upper m/2 bit of routing address as a control bit and selects output of the optical delay line.

Preferably, the address selection signal generator includes an electrical delay line and a selector. The electrical delay line receives the pulse b and delays the pulse b by multiple of τ. The selector uses lower m/2 bit of routing address as a control bit and selects output of the electrical delay line.

An optical routing circuit for decoding optical routing information received from optical communication network and routing optical signals on the basis of routing address is provided. An optical routing circuit includes a routing controller, and a routing switch.

The routing controller provides routing control signal in response to input routing signal. The routing controller includes an optical splitter, an optical address decoder and routing control signal generating part. The optical splitter splits input routing signal into $2^m$ signals. The optical address decoder converts binary routing address information into pulse position and decodes routing signal encoded with reference signal. The binary routing address information is generated through terminals of the optical splitter. The routing control signal generating part detects optical signal generated by the optical address decoder and generates routing control signal with the help of the detected optical signal. The routing switch switches routing signal provided by the routing controller.

Preferably, the optical address decoder includes an optical delay line, direct path line, and AND gate means. The optical delay line receives output signal of the optical splitter and delays the optical signal by multiple of τ. The direct path line receives output signal of the optical splitter and passes the output signal without delay. The AND gate means performs AND operation with output of the optical delay line and output of the direct path line.

Preferably, the routing control signal generating part includes a number of photo detectors, a number of OR gates, and a number of D flipflops. The number of photo detectors detects optical signal output and provides the signal output as chip selector signals of D flipflops. The photo detector is connected with output terminal of the optical address decoder. The number of OR gates performs OR operation with output signals of the photo detectors and provides output of the OR operation as reset signals of D flipflops. The photo detector connected with a D flipflop for reset signal is excluded from this OR operation. The number of D flipflops generates control signal. The D flipflops are operated by the chip selector signals and the reset signals.

Preferably, the routing switch includes a number of optical crossbar switches. The crossbar switches generate routing signal and the routing signal is controlled and provided by routing control signal generated from the routing controller.

An optical routing circuit for encoding routing information with optical signals, decoding routing information encoded by optical signals and routing optical signals on the basis of routing address is provided. An optical circuit in accordance with an embodiment of the present invention includes a routing address encoder, a pulse generator, an external modulator, an optical address generator, an address selection signal generator, an optical switch, optical OR gate means, a routing controller, and a routing switch.

The pulse generator generates ultrashort wave pulse a, b, and c. The external modulator converts the ultrashort wave pulse a and c into optical pulse. The optical address generator uses the converted optical pulse a' as a control bit for upper m/2 (m: bit number of routing address) and generates optical address d. The address selection signal generator receives the ultrashort wave pulse b, uses the ultrashort wave pulse as a control bit for lower m/2, selects an output of the optical address generator, and generates address selection signal e. The optical switch switches input of the optical address generator. The optical switch is controlled by output of the address selection signal generator. The optical OR gate means performs OR operation with reference pulse c' and output f of the optical switch and generating routing address g. The external modulator converts the reference pulse into optical signal. The routing controller generates routing control signal in response to input routing signal. The routing controller includes an optical splitter, an optical address decoder, and routing control signal generating part. The optical splitter splits input routing signal into $2^m$ signals. The optical address decoder converts binary routing address information into pulse position and decodes routing signal encoded with reference signal. The binary routing address information is generated through terminals of the optical splitter. The routing control signal generating part detects optical signal generated by the optical address decoder and generates routing control signal with the help of the detected optical signal. The routing switch switches routing signal provided by the routing controller.

BRIEF DESCRIPTION OF THE DRAWINGS

The embodiments of the present invention will be explained with reference to the accompanying drawings, in which:

FIGS. 5A and 5B are tables illustrating operation of the optical address generator and the address selection signal generator shown in FIG. 2.

DETAILED DESCRIPTION OF THE INVENTION

Figure 1A:
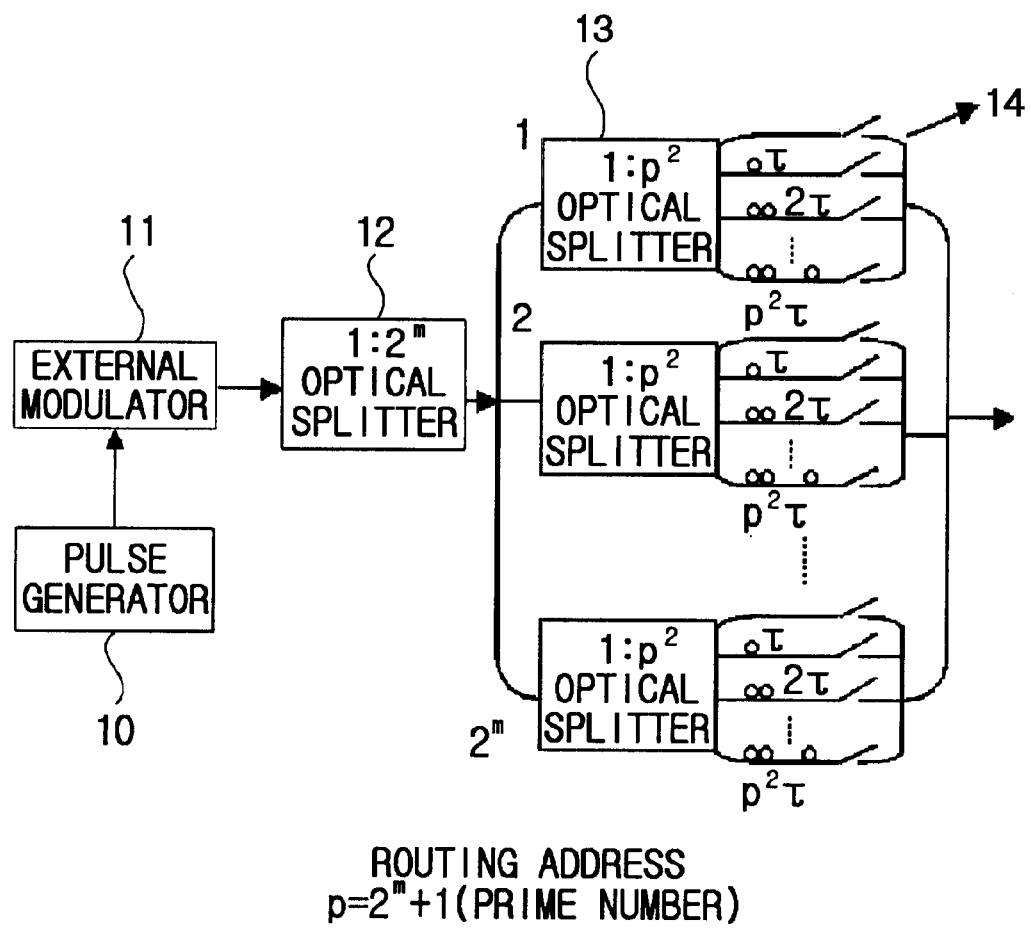
FIGS. 1A and 1B are block diagrams for illustrating a conventional address encoder and a conventional address decoder for optical routing circuit.
Figure 1B:
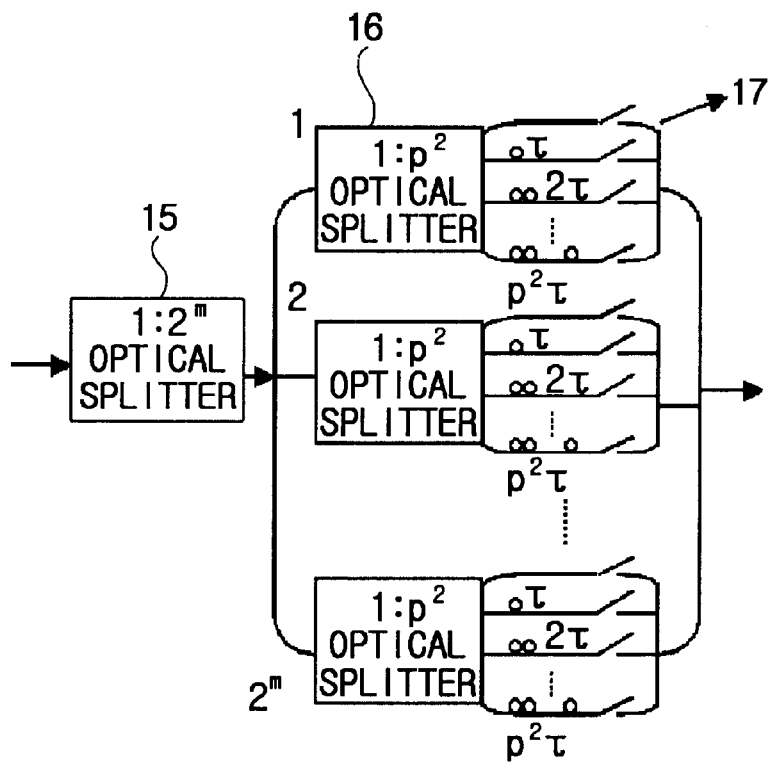
Figure 2:
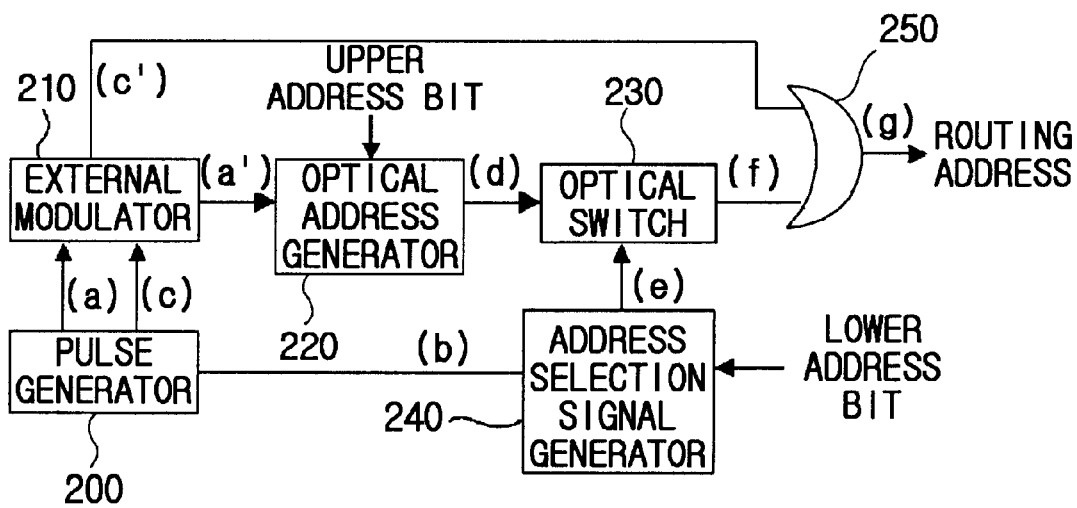
FIG. 2 is a block diagram illustrating a routing address encoder in accordance with an embodiment of the present invention.
Figure 3A:
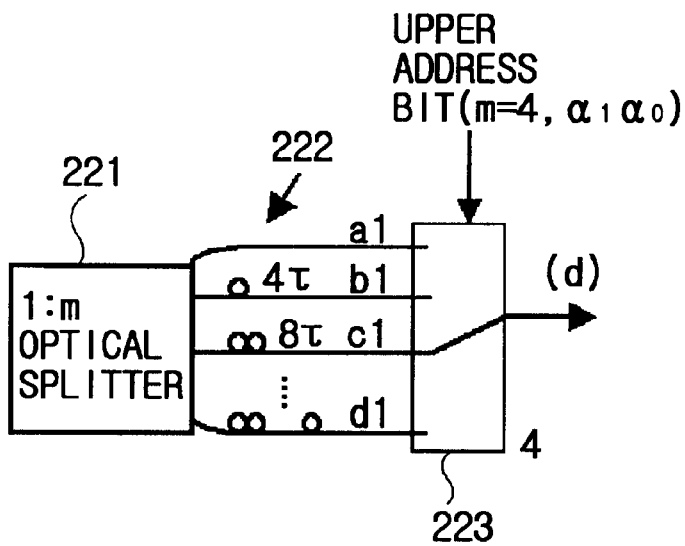
FIGS. 3A and 3B are block diagrams illustrating an optical address generator and an address selection signal generator shown in FIG. 2.
Figure 3B:
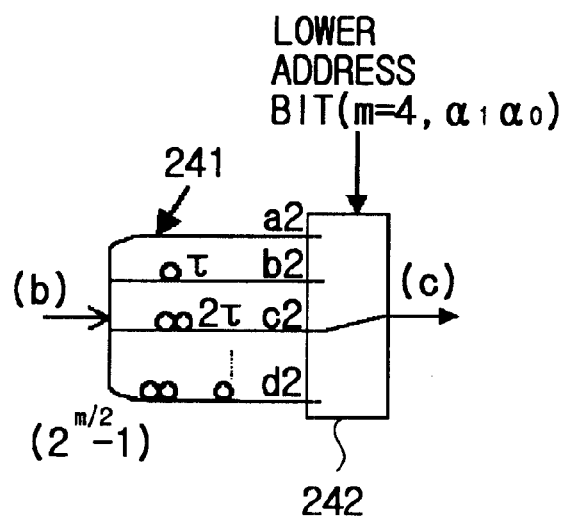

FIG. 2 is a block diagram illustrating a routing address encoder in accordance with an embodiment of the present invention. FIGS. 3A and 3B are block diagrams illustrating an optical address generator and an address selection signal generator shown in FIG. 2 when routing address bit is four, that is, m=4.

A routing address encoder in accordance with an embodiment of the present invention includes a pulse generator 200, an external modulator 210, an optical address generator 220, an address selection signal generator 240, an optical switch 230, and an optical OR gate device 250. The pulse generator 200 generates ultrashort wave pulse a, b, and c. The external modulator converts the ultrashort wave pulse a and c into optical pulse. The optical address generator 220 includes an optical splitter 221, an optical delay line 222, and an optical selector 223. The optical splitter 221 receives the pulse a and splits the pulse a into m signals, if bit number for routing address is m. The optical delay line 222 receives the split signal from the optical splitter and delays the split signal by $2^{m/2}$ multiple of τ. The optical selector 223 uses upper m/2 bit of routing address as a control bit and selects output of the optical delay line. The address selection signal generator 240 includes an electrical delay line 241 and a selector 242. The electrical delay line 241 receives the pulse b and delays the pulse b by multiple of τ. The selector 242 uses lower m/2 bit of routing address as a control bit and selects output of the electrical delay line 241. The optical address generator uses the converted optical pulse a' as a control bit for upper m/2 (m: bit number of routing address) and generates optical address d. The address selection signal generator receives the ultrashort wave pulse b, uses the ultrashort wave pulse as a control bit for lower m/2, selects an output of the optical address generator, and generates address selection signal e. The optical switch 230 switches input of the optical address generator. The optical switch is controlled by output of the address selection signal generator. The optical OR gate device 250 performs OR operation with reference pulse c' and output f of the optical switch and generates routing address g. The external modulator 210 converts the reference pulse into optical signal.

The pulse generator 200 generates ultrashort wave pulse a, b, and c. The pulse a is $2^{m/2}$ pulses with period of τ(τ=routing address encoding time $/2^m$) after reference pulse is generated. The pulse b is pulses generated with period of $2^{m/2}τ$ after τ from the reference pulse. The pulse c is the reference pulse.

Pulse a generated by the pulse generator 200 is provided to the external modulator 210. The external modulator 210 converts the pulse a into optical pulse and the optical pulse is provided to the optical address generator 220.

The reference pulse c generated by the pulse generator 200 is provided to the external modulator 210. The external modulator 210 converts the pulse c into optical pulse c' and the optical pulse c' is provided to the optical OR gate device 250.

The optical splitter 221 receives the pulse a and splits the pulse a into m signals, if bit number for routing address is m. The optical delay line 222 receives the split signal from the optical splitter and delays the split signal by $2^{m/2}$ multiple of $\tau$. For example, if m=2, which means bit number for routing address is 4, splitting terminals of the optical splitter 221 use optical delay lines of 0 $\tau$, 4$\tau$, 8$\tau$, and 12$\tau$ delay time, respectively.

Control bit for the optical selector 223 is upper m/2 bit of routing address. FIG. 5A is a table illustrating operation of the optical address generator with m=4.

The pulse b, pulses generated with period of $2^{m/2}\tau$ after $\tau$ from the reference pulse, is provided to the address selection signal generator 240.

This input is delayed by the electrical delay line 241 of $\tau$ multiples and the selector 242 determines output. Control bit for the selector 242 is lower m/2 bit of routing address. FIG. 5B is a table illustrating output of the selector 242 with m=4.

Output e of the selector 242 is control signal of the optical switch 230.

The optical switch 230 receives output of the optical address generator 220 and performs switching the optical OR gate 250 by controlling output of the address selection signal generator 240. For example, if m=4 and routing address is 0010, result is shown at f in FIG. 6.

The optical OR gate 250 adds the reference pulse c' with output pulse of the optical switch 230 and finally encoded routing address is generated.

Figure 6:
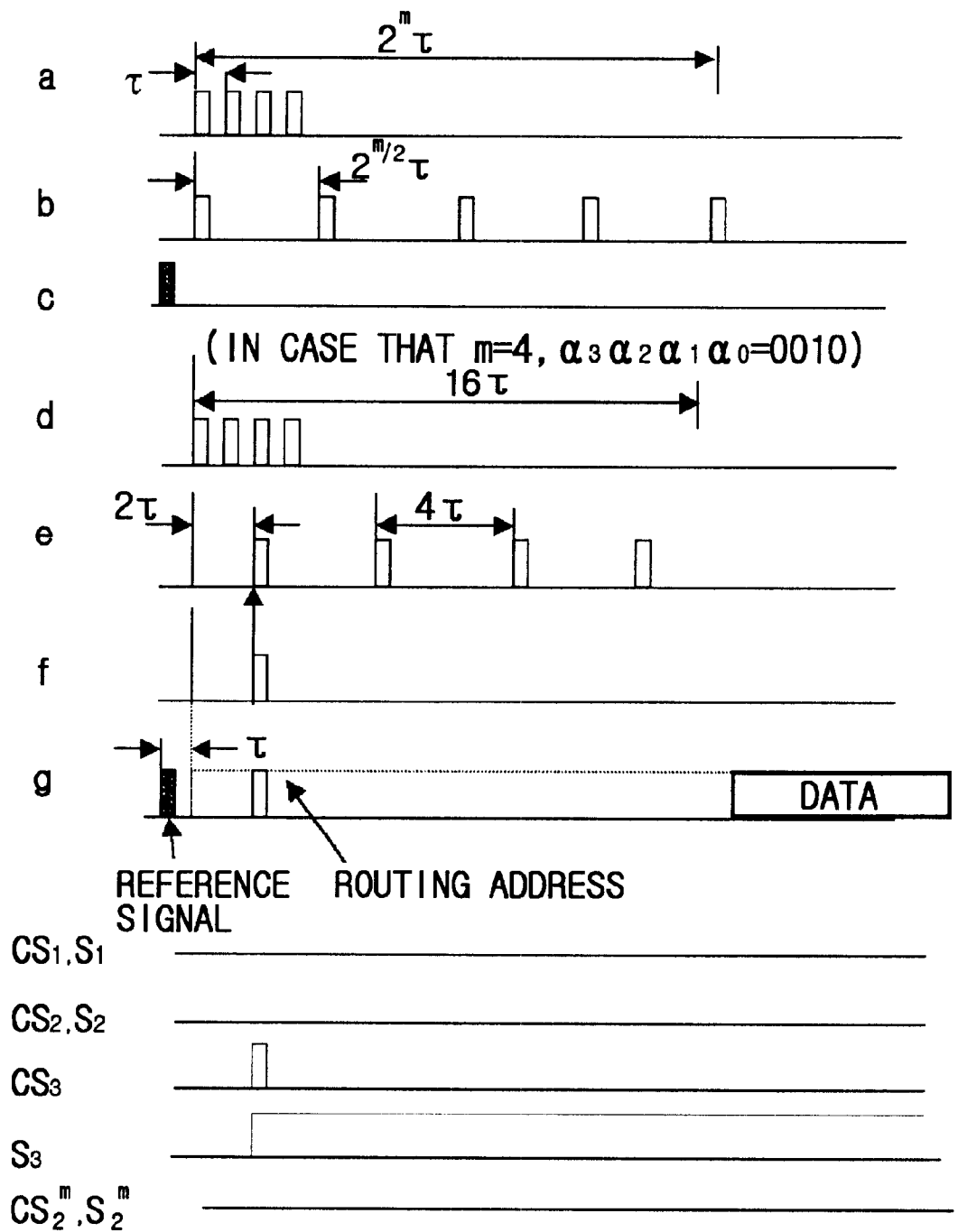
FIG. 6 is a timing diagram illustrating output of the routing address encoder and the routing controller in accordance with an embodiment of the present invention.

As shown at g in FIG. 6, routing information is generated by adding the reference signal with routing address encoding signal. Routing information including multiplexed routing data is supplied to the routing controller 300 and the routing switch 400.

Figure 4:
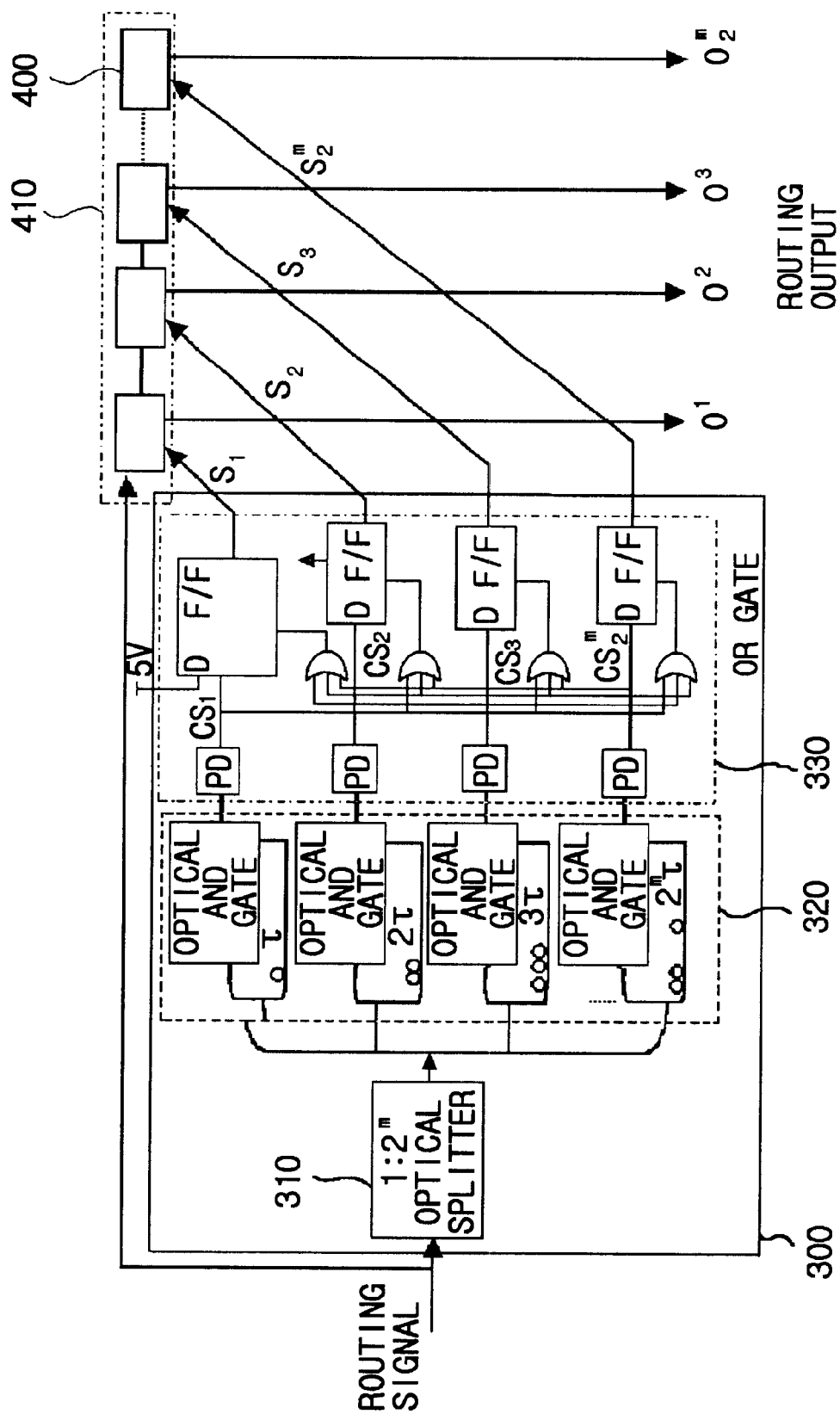
FIG. 4 is a block diagram illustrating a routing controller and a routing switch, the routing controller and the routing switch include the address decoder in accordance with an embodiment of the present invention.

FIG. 4 is a block diagram illustrating a routing controller and a routing switch and the routing controller and the routing switch include the address decoder in accordance with an embodiment of the present invention.

As shown in FIG. 4, the routing controller includes an optical splitter 310, an optical address decoder 320 and routing control signal generating part 330.

The optical splitter 310 splits input routing signal into $2^m$ signals. The optical address decoder converts binary routing address information into pulse position and decodes routing signal encoded with reference signal. The binary routing address information is generated through terminals of the optical splitter. The routing control signal generating part detects optical signal generated by the optical address decoder and generates routing control signal with the help of the detected optical signal. The routing switch switches routing signal provided by the routing controller.

The optical address decoder 320 includes an optical delay line, direct path line, and an AND gate device. The optical delay line receives output signal of the optical splitter and delays the optical signal by multiple of $\tau$. The direct path line receives output signal of the optical splitter and passes the output signal without delay. The AND gate device performs AND operation with output of the optical delay line and output of the direct path line.

The routing control signal generating part 330 includes a number of photo detectors, a number of OR gates, and a number of D flipflops. $2^m$ photo detectors detect optical signal output and provide the signal output as chip selector signals of D flipflops. A photo detector is connected with an output terminal of the optical address decoder. $2^m$ OR gates performs OR operation with output signals of the photo detectors and provides output of the OR operation as reset signals of D flipflops. The photo detector connected with a D flipflop for reset signal is excluded from this OR operation. $2^m$ D flipflops generate control signal. The D flipflops are operated by the chip selector signals and the reset signals.

The routing switch includes $2^m$ optical crossbar switches 410. The crossbar switches generate routing signal and the routing signal is controlled and provided by routing control signal generated from the routing controller 300.

The routing controller and the routing switch operate as follows.

Routing signal g, signal encoded with the reference signal and signal converted into pulse position from binary routing address information, is provided to the optical splitter 310 of the routing controller 300 and the routing switch 400.

The optical splitter 310 splits input routing signal provided to the routing controller 300 into $2^m$ signals.

Optical signals from each output terminal of the optical splitter 310 are provided to the optical AND gate through the direct path line and the optical delay line of $\tau$ multiples. The optical AND gate decodes the encoded routing signal by multiplying the signal that is not delayed by optical signal delayed by $\tau$ multiples.

Output of each optical AND gate is connected with a photo detector and the photo detector detects whether optical signal is generated from the AND gate. The output of the photo detector is used as chip selector signals for the D flipflop attached to the photo detector. Also, the output of the photo detector is used for $2^m-1$ D flipflops as source in generating reset signals.

That is, if one routing signal is provided, optical signal is detected at only one of the photo detectors and the output of the photo detector works as chip selector signal for D flipflop that is connected with the photo detector. The output of the D flipflop (5 V) switches on one of $2^m$ optical crossbar switches of the routing switch 400 to generate routing signal.

In addition, output of the photo detector that detects optical signal is provided to OR gate devices providing reset signals to D flipflops except one D flipflop to which the photo detector provides chip selector signal and resets the D flipflops. Therefore, only one optical crossbar switch among $2^m$ optical crossbar switches 410 of the routing switch 400 is on and the rest are off.

For example, if routing address is 0010, routing signal shown at (g) in FIG. 6 is provided. The optical splitter 310 splits the routing signal into $2^m$ signals. Optical pulse of the routing address is provided to the AND gate at the moment when the reference signal is delayed by 3$\tau$ and provided to the AND gate. Therefore, optical signal is detected only at the third photo detector that is connected with the third optical AND gate. No optical signal is detected at other $2^m-1$ photo detectors.

If optical signal is detected at the third photo detector, chip selector signal (CS3) for the third D flipflop and reset signals for the other D flipflops are generated as shown in FIG. 6. Therefore, routing control signal (S3) is generated at the third D flipflop. The routing control signal switches on the third optical crossbar switch 410 and routing signal is generated to the selected path.

As described above, embodiments of the present invention shows that number optical splitters and number and length of optical delay lines may be decreased in implementing routing address encoders, routing controllers, and routing switches for optical routing circuits. Consequently, low optical loss and compact size are accomplished.

Although representative embodiments of the present invention have been disclosed for illustrative purpose, those who are skilled in the art will appreciate that various modifications, additions and substitutions are possible without departing from the scope and spirit of the present invention as defined in the accompanying claims.

What we claim:

1. A routing address encoder for encoding routing information with optical signals in optical communication networks, comprising:

a pulse generator for generating ultrashort wave pulses;

an external modulator for converting the ultrashort wave pulses into optical pulses;

an optical address generator for using the optical pulses as a control bit for an upper m/2 (m: a bit number of the routing address) and generating an optical address;

an address selection signal generator for receiving the ultrashort wave pulses, using the ultrashort wave pulses as a control bit for a lower m/2, selecting an output of the optical address generator, and generating an address selection signal;

an optical switch for switching the output of the optical address generator, the optical switch being controlled by an output of the address selection signal generator; and an optical OR gate for performing OR operation with the optical pulses and an output of the optical switch and generating routing address.

2. The routing address encoder of claim 1, wherein a portion of the pulse inputted to the external modulator is a reference pulse, the other pulse inputted to the external modulator is continuously generated $2^{m/2}$ pulse with a period $\tau$ ($\tau$=routing address encoding time/$2^m$) after the reference pulse is generated, the pulse inputted to address selection signal generator is a pulse generated with $2^{m/2}\tau$ period after $\tau$ from generating the reference pulse.

3. The routing address encoder of claim 1, wherein the optical address generator comprises:

an optical splitter for receiving the ultra wave pulse and splitting the ultra wave pulse into m signals, if a bit number for the routing address is m;

an optical delay line for receiving the split signal from the optical splitter and delaying the split signal by $2^{m/2}$ multiple of $\tau$;

an optical selector for using the upper m/2 bit of the routing address as the control bit and selecting an output of the optical delay line.

4. The routing address encoder of claim 1, wherein the address selection signal generator comprises:

an electrical delay line for receiving the ultra wave pulses and delaying the ultra wave pulses by multiple of $\tau$; and a selector for using the lower m/2 bit of the routing address as the control bit and selecting an output of the electrical delay line.

5. An optical routing circuit for decoding optical routing information received from an optical communication network and routing optical signals on the basis of a routing address, comprising:

a routing controller for providing a routing control signal in response to the routing signal, the routing controller comprising:

an optical splitter for splitting a routing signal into $2^m$ signals;

an optical address decoder for converting binary routing address information into a pulse position and decoding the routing signal encoded with a reference signal, the binary routing address information being generated through terminals of the optical splitter;

a routing control signal generator for detecting an optical signal generated by the optical address decoder and generating a routing control signal with the help of the detected optical signal, a routing switch for switching the routing signal provided by the routing controller.

6. The optical routing circuit of claim 5, wherein the optical address decoder comprises:

an optical delay line for receiving an output signal of the optical splitter and delaying the optical signal by multiple of $\tau$;

a direct path line for receiving the output signal of the optical splitter and passing the output signal without a delay; and an AND gate for performing AND operation with an output of the optical delay line and an output of the direct path line.

7. The optical routing circuit of claim 5, wherein the routing control signal generator comprises:

a plurality of photo detectors for detecting optical signal output and providing the signal output as chip selector signals of D flip-flops, the photo detector being connected with an output terminal of the optical address decoder;

a plurality of OR gates for performing OR operation with an output signals of the photo detectors and providing an output of the OR operation as reset signals of D flip-flops, the photo detector connected with the D flip-flop for a reset signal being excluded from the OR operation; and a plurality of D flip-flops for generating a control signal, the D flip-flops being operated by the chip selector signals and the reset signals.

8. The optical routing circuit of claim 5, wherein the routing switch comprises a plurality of optical crossbar switches, the crossbar switches generating the routing signal, the routing signal being controlled and provided by the routing control signal generated from the routing controller.

9. An optical routing circuit for encoding routing information with optical signals, decoding routing information encoded by optical signals and routing optical signals on the basis of a routing address, comprising:

a routing address encoder for encoding with optical signals, the routing address encoder comprising:

a pulse generator for generating ultrashort wave pulses;

an external modulator for converting the ultrashort wave pulses into optical pulses;

an optical address generator for using the optical pulses as a control bit for an upper m/2 (m: a bit number of the routing address) and generating an optical address;

an address selection signal generator for receiving the ultrashort wave pulses, using the ultrashort wave pulses as a control bit for a lower m/2, selecting an output of the optical address generator, and generating an address selection signal;

an optical switch for switching the output of the optical address generator, the optical switch being controlled by an output of the address selection signal generator; and an optical OR gate for performing OR operation with the optical pulses and an output of the optical switch and generating routing address;

a routing controller for generating routing control signal in response to input routing signal, the routing controller comprising:

an optical splitter for splitting a routing signal into $2^m$ signals;

an optical address decoder for converting binary routing address information into a pulse position and decoding the routing signal encoded with a reference signal, the binary routing address information being generated through terminals of the optical splitter; and a routing control signal generator for detecting an optical signal generated by the optical address decoder and generating a routing control signal with the help of the detected optical signal;

a routing switch for switching the routing signal provided by the routing controller.

* * * * *